March 11, 1941.  A. VAN DILLEN  2,234,886
SPRING DEVICE FOR VEHICLES
Filed Nov. 22, 1937  2 Sheets-Sheet 1

Inventor:
A. van Dillen
By E. F. Wenderoth
atty

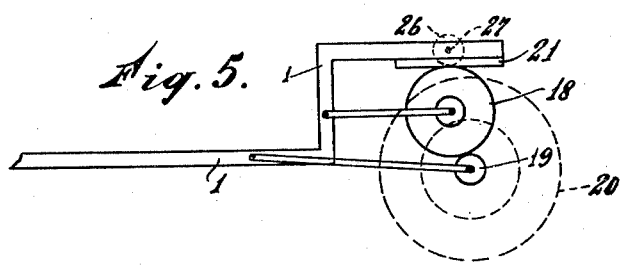
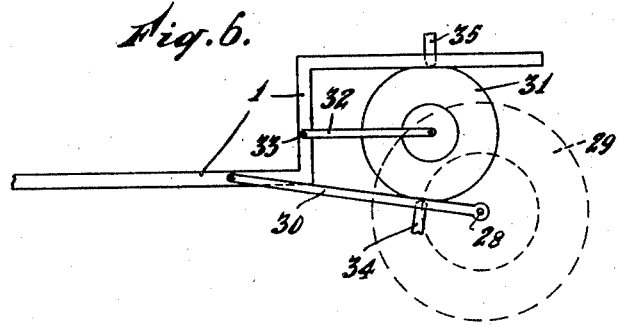
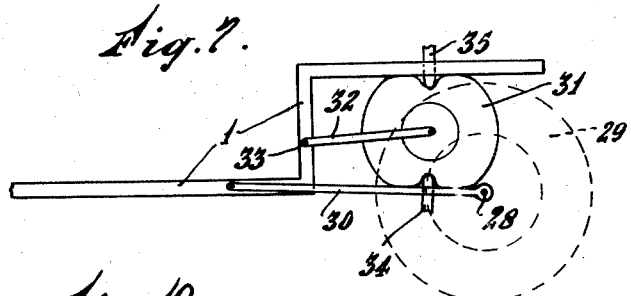
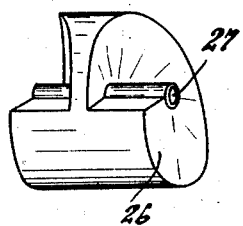
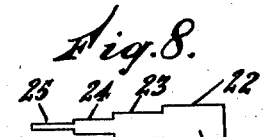
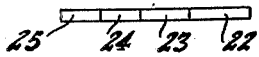

Patented Mar. 11, 1941

2,234,886

UNITED STATES PATENT OFFICE 2,234,886

SPRING DEVICE FOR VEHICLES

Albert van Dillen, Amsterdam, Netherlands

Application November 22, 1937, Serial No. 175,963
In the Netherlands October 17, 1936

2 Claims. (Cl. 267—15)

The invention relates to a resilient or spring device for or in vehicles, such as motor cars, railway carriages, bicycles, etc., and has for its purpose to produce an improved and if desired controllable spring action with the aid of simple means which need very little repair.

The principle of the invention resides in the feature that the vehicle chassis or frame is resiliently supported by resilient elements non-vertically resting one upon the other, at least one of which is a pneumatic tire, the relative position and/or the mutual contacting surface of the resilient elements being adjustable. In this manner in the first place an improved spring action is obtained over that of wheels arranged vertically one above the other, i. e. a central resilient action while the wheels are favourably positioned with regard to each other. The construction becomes lower and more compact.

Moreover, the adjustability referred to above enables, to control the resilient action e. g. to adapt the same more or less to the load, or to the nature of the road over which the vehicle is traveling. When traveling e. g. over a road liable to cause a succession of slight shocks, the resilient action may be controlled accordingly. Depending on the construction of the control means, this may be done either during the drive, or before.

A practical solution of the problem may reside in employing a circular contacting surface either resilient or not and resting on a wheel tire of the resilient system, which tire may either be elastic or not, the said contacting surface being movable eccentrically with regard to the centre of the said wheel tire. By eccentrically displacing the above mentioned contacting surface, it will therefore be possible to produce a more or less vigorous compression of the wheel tire, thus obtaining improved resilient action. This makes it possible to drive either with heavily inflated tires, cushion tires, or even with solid tires on the road wheels. The criterion consequently is a greater or smaller degree of compression controlled by adjustment while using the same contacting surfaces.

Another practical solution may consist in using a control member having a contacting surface comprising different contacting elements, such as e. g. a block rotatable on an axis, which block has an eccentrically rounded or irregularly formed surface or else a rod-shaped member which is slidable in a longitudinal direction, having a contacting surface of varying height or provided with contact elements of different heights or widths succeeding each other in the sliding direction in such a way that each of them produces a different compression of the elastic tire against which it is adjusted.

The invention is further elucidated with the aid of the drawings which show a number of diagrammatically represented embodiments of the invention.

Fig. 1 represents an embodiment of the principle of increased and variable resilient action by means of an eccentrically displaceable wheel.

Fig. 2 gives an explanation of the principle of variable spring action by means of a contact block having different contacting surfaces.

Fig. 5 relates to a construction in which the principle of non-vertically arranged wheels is combined with that of a variable contacting surface.

Figs. 6 and 7 represent a variation of this construction in two different positions.

Figs. 8 and 9 are a side elevation and a plan view respectively of a slidable contacting member.

Fig. 10 is an illustration in perspective of a rotatable contacting member.

Figure 1:
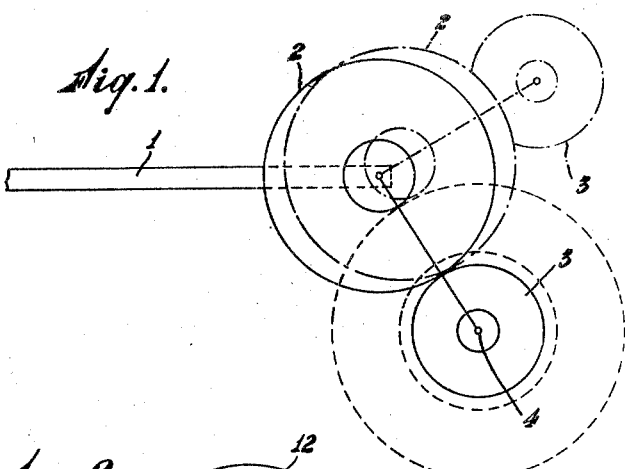

According to Fig. 1, a wheel 2 provided e. g. with a pneumatic tire is arranged displaceably and if desired, rotatably on a part 1 of a chassis. This wheel is resting non-vertically on a wheel 3 e. g. also provided with a pneumatic tire, which wheel 3 is mounted on the shaft 4 of a vehicle wheel not illustrated in the drawings. The wheel 2 may be displaced eccentrically with regard to the wheel 3. The result produced thereby is further explained in Fig. 1. If the wheel 3 follows the circular circumference of the wheel 2 according to the full line, no resilient action will occur as yet. If the wheel 2 is eccentrically displaced into the position indicated in dotted lines, the wheel 3 will be compelled to follow the circle drawn in a dotted line, whereby the tire of the wheel 3 will be compressed more. This will produce more intensive resilient action. Due to the resilient action produced by the wheel 3, the tire which travels over the road surface, may be inflated more, whereby the wear of the said tire and the danger of punctures are lessened; it would be even possible to use appropriately constructed cushion tires instead of pneumatic tires.

Figure 2:
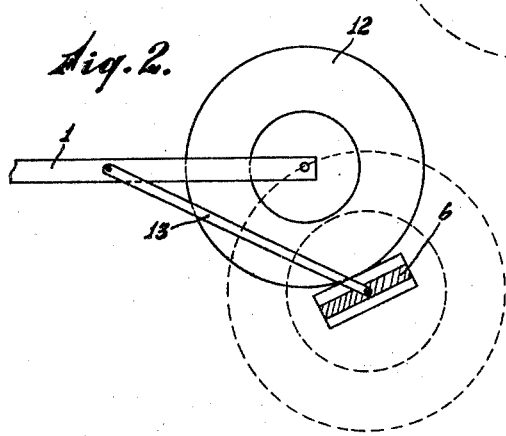
Figure 3:
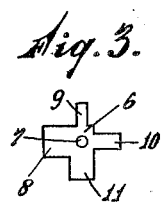
Fig. 3 is an end view of a similar contact block.

According to Figs. 2 and 3 the wheel 3 of Fig. 1 is replaced by a controlling block 6 mounted on the shaft of the road wheels. The cross section of the block may be of the irregular form indicated in Fig. 3 and is rotatable about its longitudinal axis 7 in such a way that successively the contacting elements 8—11 (Fig. 3) may be brought into contact with the tire of the wheel 12. Owing to the different widths of contact surfaces 8—11, correspondingly different resilient actions are obtained. The block 6 is hingedly connected with the part 1 of the frame by means of a carrier 13.

Figure 4:
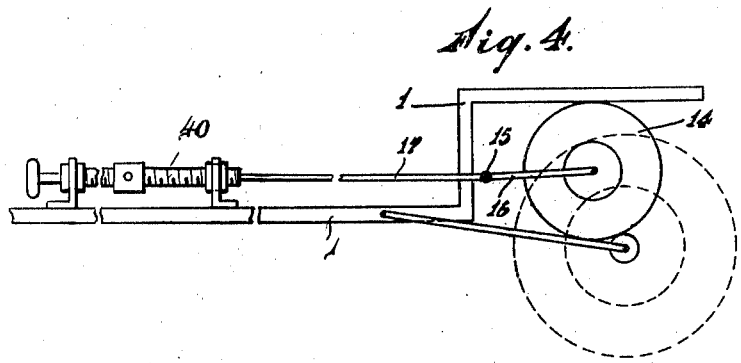
Fig. 4 is a variation of the construction according to Fig. 1.

According to Fig. 4 a wheel 14, freely rotatable about its axis, is adapted to swing about the hingepoint 15 at which a carrier 16 is connected with a slidable rod 17, so that the point 15 may be adjusted at a greater or a smaller distance from the part 1 of the frame. According to whether the wheel 14 is positioned more or less non-vertically with regard to the shaft of the road wheel, the resilient action will offer more or less resistance. The resilient action consequently will be very supple when the point 15 is resting against the part 1 of the frame. The slidable rod 17 is connected to a screw 40 which is manually operated as shown in Fig. 4 in order to adjust the point 15.

In Fig. 5 the stationary wheel 18 is resting non-vertically on the wheel 19 which is mounted on the shaft of the road wheel 20. The part 1 of the frame to which the wheel 18 is hingedly connected by means of a support is provided with a control member located above the wheel 18, one embodiment of which member is drawn diagrammatically in full lines and another embodiment likewise diagrammatically in dotted lines.

The first embodiment may be made in accordance with Figs. 8 and 9, the second one according to Fig. 10.

In the first case the flat control member 21 is adjustable in longitudinal direction in such a way that successively the elements 22—25 having different heights or widths may be moved against the wheel 18. In the second case the control member 26 has the eccentric or irregularly rounded form according to Fig. 10, while it is rotatable on an axis 27. In both cases it is therefore possible to influence the resilient action by adjusting (pushing or turning) the control member.

In Figs. 6 and 7 the part of the frame is once more indicated at 1. 28 is the shaft of the road wheel 29, which shaft is hingedly connected with the part 1 of the frame by a support 30. The wheel 31 is rotatably mounted on an arm 32 which at 33 is hingedly connected with the part 1 of the frame. Control members which may be adjusted in a direction towards or away from the wheel 31 are indicated by 34 and 35. In Fig. 6 the wheel 31 is subjected to its slightest compression, since the control members are drawn backwards with regard to the said wheel 31 and the contacting surfaces have attained their maximum. In Fig. 7 the control members are pressed inwardly, reducing the contacting surfaces, producing a greater compression with the same wheel load. The condition according to Fig. 7 may be utilized for a more or less constant load combined with a large contacting surface, whereas the condition according to Fig. 7 with its reduced contacting surface may be utilized for suddenly increasing loads on an uneven road surface.

In Fig. 6 this increased load would produce only very slight results.

The embodiments shown in the drawings are merely given as examples, but they are in no way intended to restrict the scope of the invention.

I claim:

1. In a vehicle having longitudinal frame members and an axle, a resilient suspension comprising an air cushion mounted between each end of the axle and a frame member and directly engaging the same at points situated in different transverse vertical planes, manually operable adjusting means on said frame members and connected to said cushions adapted to displace the same longitudinally of said frame members in such a manner that the line connecting the supporting points of the frame members and the axle on said cushions is angularly displaced with reference to a vertical transverse plane through said axle.

2. In a vehicle having longitudinal frame members and an axle, a resilient suspension comprising an air cushion mounted between each end of the axle and a frame member and directly engaging the same at points situated in different transverse vertical planes, manually operable adjusting means on said frame members and connected to said cushions adapted to displace the same longitudinally of said frame members in such a manner that the line connecting the supporting points of the frame members and the axle on said cushions is angularly displaced with reference to a vertical transverse plane through said axle and each air cushion consisting of a pneumatic tire mounted on a shaft parallel to said axle and said adjusting means being connected to said shaft.

ALBERT van DILLEN.